United States Patent
Combee

(10) Patent No.: US 9,694,885 B2
(45) Date of Patent: Jul. 4, 2017

(54) APPARATUS AND METHOD FOR CONTROL OF SEISMIC SURVEY EQUIPMENT

(71) Applicant: WESTERNGECO L.L.C., Houston, TX (US)

(72) Inventor: Leendert Combee, Asker (NO)

(73) Assignee: WESTERNECO L.L.C., Houston, TX (US)

( * ) Notice: Subject to any disclaimer, the term of this patent is extended or adjusted under 35 U.S.C. 154(b) by 0 days.

(21) Appl. No.: 15/101,434

(22) PCT Filed: Dec. 4, 2014

(86) PCT No.: PCT/US2014/068643
§ 371 (c)(1),
(2) Date: Jun. 3, 2016

(87) PCT Pub. No.: WO2015/085104
PCT Pub. Date: Jun. 11, 2015

(65) Prior Publication Data
US 2016/0304172 A1 Oct. 20, 2016

Related U.S. Application Data

(60) Provisional application No. 61/911,867, filed on Dec. 4, 2013.

(51) Int. Cl.
*B63B 35/00* (2006.01)
*B63B 49/00* (2006.01)
(Continued)

(52) U.S. Cl.
CPC ............... *B63G 8/20* (2013.01); *B63B 35/00* (2013.01); *B63B 49/00* (2013.01); *B63G 8/001* (2013.01);
(Continued)

(58) Field of Classification Search
None
See application file for complete search history.

(56) References Cited

U.S. PATENT DOCUMENTS

| | | | | |
|---|---|---|---|---|
| 6,590,831 B1 * | 7/2003 | Bennett | ................... | B63B 21/66 367/16 |
| 6,951,138 B1 * | 10/2005 | Jones | ................... | G01V 1/3852 367/159 |

(Continued)

OTHER PUBLICATIONS

Yufeng Mao, Yongjie Pang, Zhaoli Wang, Underwater Vehicle's Long Voyage Path Planning in Complex Sea Condition, IEEE Int.conf. on Intelligent Computing and Intelligent systems, 2009, p. 661-665.

(Continued)

*Primary Examiner* — Russell Frejd

(57) ABSTRACT

An unmanned water vessel can include a body defining an internal volume and having a shape adapted to travel through water, with a front and a back; at least one directional device that is exposed to the flow of water past the vehicle when the vehicle travels in a forward direction, the directional device having a first position that provides an angle of attack through the water flow and a second position that provides a second angle of attack through the water flow; and a control system that provides commands to the at least one directional device in view of a starting point, an end point, and at least information about water flow expected to be encountered by the water vessel during travel.

19 Claims, 3 Drawing Sheets

(51) Int. Cl.
    *B63B 21/66*     (2006.01)
    *G05D 1/02*     (2006.01)
    *G01V 1/38*     (2006.01)
    *B63G 8/00*     (2006.01)
    *B63G 8/20*     (2006.01)
    *B63G 8/42*     (2006.01)
    *B63G 8/26*     (2006.01)
    *B63G 8/16*     (2006.01)
    *B63G 8/18*     (2006.01)
    *B63H 25/46*     (2006.01)
    *B63H 25/42*     (2006.01)
    *B63H 25/52*     (2006.01)
    *B63H 25/04*     (2006.01)
    *B63H 25/06*     (2006.01)
    *G01C 21/20*     (2006.01)

(52) U.S. Cl.
    CPC ............ *B63G 8/16* (2013.01); *B63G 8/18* (2013.01); *B63G 8/26* (2013.01); *B63G 8/42* (2013.01); *B63H 25/04* (2013.01); *B63H 25/06* (2013.01); *B63H 25/42* (2013.01); *B63H 25/46* (2013.01); *B63H 25/52* (2013.01); *G01V 1/3817* (2013.01); *G01V 1/3835* (2013.01); *G01V 1/3843* (2013.01); *G05D 1/0206* (2013.01); *B63B 2035/007* (2013.01); *B63B 2035/008* (2013.01); *B63G 2008/004* (2013.01); *B63G 2008/005* (2013.01); *G01C 21/203* (2013.01); *Y02T 70/747* (2013.01)

(56) References Cited

U.S. PATENT DOCUMENTS

| | | | |
|---|---|---|---|
| 7,965,583 B2 * | 6/2011 | Thomas | G01V 1/3808 367/16 |
| 8,473,175 B2 | 6/2013 | Holo et al. | |
| 8,717,844 B2 * | 5/2014 | Welker | B63B 27/36 181/122 |
| 8,824,239 B2 | 9/2014 | Welker et al. | |
| 2009/0279385 A1 | 11/2009 | Hillesund et al. | |
| 2010/0235018 A1 | 9/2010 | Christ | |
| 2013/0142012 A1 | 6/2013 | Schultz et al. | |
| 2014/0140170 A1 * | 5/2014 | Brizard | B63G 8/001 367/16 |

OTHER PUBLICATIONS

International Search Report and Written Opinion in the related international application PCT/US2014/068643, mailed on Mar. 19, 2015, 16 pages.

* cited by examiner

APPARATUS AND METHOD FOR CONTROL OF SEISMIC SURVEY EQUIPMENT

RELATED APPLICATIONS

This application claims priority to U.S. Provisional Patent Application No. 61/911,867 that was filed on Dec. 4, 2013, the entirely of which is incorporated herein by reference.

TECHNICAL FIELD

The present application relates to water and/or ocean vessel travel and navigation, and more particularly to using future current or other exterior force information to better predict, plan and/or implement optimal travel of the vessel.

BACKGROUND

Seismic surveying can be applied to the search and evaluation of subterranean hydrocarbons. One type of seismic survey is generally referred to as a towed marine survey, and includes a manned vessel towing a series of seismic streamers (containing seismic sensors) behind the vessel, and creating an impulse that travels through the water and into the formation, where the impulse reflects and reverberates back to the streamers through the water. The signals are detected and recorded by the sensors, and data is produced. This data can be analyzed and processed to provide information (often images) to represent aspects of the formation such as presence of minerals such as hydrocarbons, or lack thereof.

Land surveys are different from marine surveys in that they occur on "dry" land (or shallow water such as swamps or wetland). Large numbers of sensors are placed on or in the ground, an impulse is provided into the ground and reflects and reverberates against the formation, and the sensors detect the signals. The detected signals are recorded as data that can be analyzed and processed to provide information (often images) to represent aspects of the formation such as presence of minerals such as hydrocarbons, or lack thereof.

Towed marine surveys are not suitable for every marine survey situation. Thus, seabed surveys can be used. In seabed surveys the principals of the sensors and the impulse are similar, but sensors are placed directly on, into, or very close to the seabed. The sensors can be in the form of nodes (similar to land) or as cables containing sensors (similar to those used in marine surveys), or a combination thereof.

Deployment and retrieval of the sensors for seabed surveys in such a way as to be useful and efficient enough to allow for a technically and commercially successful survey is difficult.

The present application provides a number of combined features to address unmet needs in those areas.

SUMMARY

The summary presented herein is to help the understanding of one skilled in the art with respect to the combinations of embodied features disclosed here. They are not meant in any way to unduly limit any present or future claims related to this application.

Various embodiments relate to a water vessel having a body having a shape adapted to travel through water; at least one directional device that is exposed to the movement of water past the vehicle when the vehicle travels in a forward direction, the directional device having a first position that provides an angle of attack through the water flow and a second position that provides a second angle of attach through the water flow; and a control system that provides commands to the at least one directional device in view of an end point, and at least information about water movement expected to be encountered by the water vessel during travel.

Various embodiments relate to a water vessel comprising: a body having a shape adapted to travel through water; at least one propulsion device that has a first setting that does not provide steering force to the vessel, and a second setting that provides a steering force to the vessel; a control system that provides commands to the at least one propulsion device to select between the first and second setting in view of an end point, and at least information about water movement expected to be encountered by the water vessel during travel.

Various embodiments relate to a method of traveling an unmanned water vessel from a start position to an end position including selecting a starting position based at least in part of water movement information for water that is expected to be encountered by the water vessel over the course of travel; and steering the unmanned water vessel at least based on the water movement information.

DESCRIPTION OF THE FIGURES

The figures presented herein are to help the understanding of one skilled in the art with respect to the combinations of embodied features disclosed here. They are not meant in any way to unduly limit any present or future claims related to this application.

DETAILED DESCRIPTION

Figure 1:
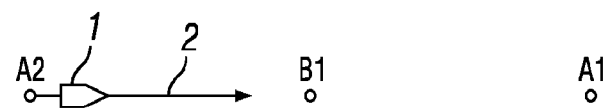
FIG. 1 is a schematic of various embodied features.

The following detailed description is presented to help one skilled in the art understand the various combinations of embodied features described herein, and is not meant in any way to unduly limit any present or future claims related to this application.

This present application describes a number of combinations of embodied features. The present application describes a method for deploying, relocating and recovering autonomous or semi-autonomous, or remote controlled, surface and/or underwater unmanned marine surveying vessels, including buoys, gliders, underwater marine gliders and autonomous underwater vessels, so as to improve power consumption and efficiency of travel from one point to another, in view of various external forces such as water flow, ocean currents, wind, thermal inclines or declines, or other external forces.

Marine surveying, including seismic surveying, may be based on deploying autonomous or remote marine vessels in the sea (or other body of water). Such deployment can be at the surface of the sea. These can be unmanned vessels. Some types of vessels can remain at the surface. Other types of vessels may descend below the surface into the water-column, including vessels that descend to the seabed, and including vessels that glide through the water-column.

U.S. Pat. No. 6,951,138 provides description of one such vessel, and is incorporated herein by reference in its entirety. U.S. Pat. No. 8,717,844 describes a vessel that adjusts buoyancy and rises and falls in the water, thereby propelling itself forward, and is incorporated herein by reference in its entirety. U.S. Pat. No. 7,965,583 describes another vessel and is incorporated herein by reference in its entirety. It is noted that many of the ideas and designs in the present application are not vessel specific and can be applied to a number of different variations of vessel.

Some vessels may be passive or essentially passive, i.e., they do not at all, minimally, or intermittently employ a powered thruster. One type of vessel drops by its low buoyancy from an upper level of the water toward the ocean bottom. Another use is propellers that rotate and produce force in a direction. Another uses a jet thruster. Vessels can similarly use high buoyancy to travel from a lower location in the water upward, and use fins to direct the device and control the path of travel, including lateral movement forward or backward. Vessels can also use wind, wave movement, and current as a primary source of propulsion. Other embodiments of a vessel can be powered at all times, or substantially all the time. These can use drift also, but rely on power for final guidance and movement when near the destination location.

As noted above, fins (or other flow deflector devices) may be used to actively control the forces experienced by the vessel and thus the travel direction though the water. Also the propulsion device, such as a propeller or jet thruster, can be angled to provide steering and guidance. For passive or essentially passive vessels, thrusters can be used intermittently for positioning and steering. Multiple thrusters can be positioned on the vessel to provide force to move the vessel linearly, and/or to provide rotational force to the vessel (singularly or multiple thrusters used together). Fins or rudders can be used to steer the vessel. Also, buoyancy devices can control rise and fall of a vessel in water and be used for vertical steering.

Vessels can have active propulsion deriving power from at least one source of non-renewable energy (electric batteries, fuel cell, fuel, gasoline engines). Also, the vessels can have components of renewable energy such as solar power, wave power, or wind power. Non-renewable and renewable energy sources can both be used on a single vessel, such as solar power to charge batteries. In any event, it is still valuable to choose an efficient deployment position and steer advantageously to provide efficient travel.

Geophysical surveying—including seismic and/or electromagnetic surveying—may simultaneously operate a large group (10's to 100's to 1000's) of marine vehicles within one surveying area. Because large numbers of devices may need to be stored, deployed and recovered, their size can be limited, and hence there can be a limited and restricted volume within each vessel for power storage hardware. As a result, the total stored power available can be restricted and various possibilities for limiting the overall power consumption can be beneficial. Various combinations of embodied features herein describe systems and methods for optimizing the overall power consumption of said vessel for a given travel from one point to another when faced with external forces such as water movement.

According to embodiments, the present application describes methods for deploying, recovering and relocating vessels that will travel from a first location to a second location, such as being located at a point on the surface of the sea and traveling to the seabed, when exposed to water movement over the expected course of travel.

In a method of geophysical surveying envisaged, 10's, 100's to 1000's of devices may be deployed from a surface marine vessel at the surface of the sea and by gliding and/or propelled motion, travel to locations on the seabed. These devices may also, by gliding and/or propelled motion, navigate towards a predefined final position or area, on the sea-surface or on the seabed. Over the course of travel water movement will apply various forces to the vessel.

Devices that navigate to the seabed can remain at the seabed for a certain period of time (minutes, hours, days, weeks) before they either return to the surface or relocate to another seabed position. In that situation the vessels can act as seismic nodes while on the seabed. While on the seabed, these vessels may make measurements of a geophysical nature, for example: seismic measurements, electromagnetic measurements, gravity measurements, biological measurements, chemical measurements, and so on. As a result, a significant amount of time is spent in motion in order to navigate to and from positions on the seabed. In order to reach these positions within accuracy (typically between 1 meter and several meters), external thrust may be used to navigate and steer the devices. As a result, aside from the power used to operate the measurement equipment (sensors, analogue amplifiers, digitization circuits, memory and clock, processing units, telecommunication and navigation systems including compasses, inertial sensors, gyros, modems, antennas etc.) available battery power is used for navigating from the deployment position to the seabed position, from the seabed position to the recovery position, and, if applicable, the relocation from one seabed position to a next seabed position.

As shown in FIG. 1, the trajectory of a vessel 1 can follow from a position A2 to a next position B1. This trajectory can be along the surface (two dimensions), underwater (two or three dimensions), or a combination thereof. As shown in FIG. 1, the travel path (trajectory) 2 is a straight line.

Often times the vessel experiences external forces (such as water movement) along its trip from point A2 to point B1. These forces can affect the direction the vessel steers in order to arrive at point A2, the time it takes to travel, and the velocity of the vessel. Drift due to external sea-current may constitute an impediment for a gliding device—be it on the surface or below the surface in the water—to reach its desired position in a timely manner along a predefined trajectory. A vessel's speed may be between 0.5-1.5 knots whereas sea-currents may be up to 1 knot but may be much larger in certain areas. As a result, the proper trajectory and steering may be impacted by the induced drift due to sea-currents. With a vessel traveling by way of drifting, in view of the direction of the sea-currents the net result may be that for a period of time the device will actually drift away from the desired final location instead of towards it. This can be the case with non-linear currents such as large eddies.

Figure 2:
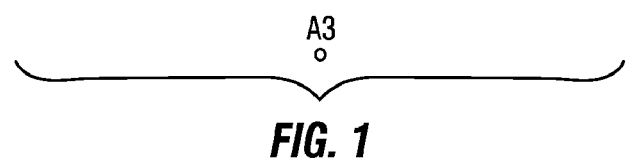
FIG. 2 is a schematic of various embodied features.

FIG. 2 shows an effect of a sea current 4 flowing against the travel path 10 of the vessel 1. In FIG. 2, when the vessel travels from point A2 to B1, along path 10, the sea current 4 works against the vessel 1. In the case where the vessel 1 travels from point A1 to B1 along path 11, the sea current 4 works with the vessel.

If the sea-current data indicates that there is a substantial sea-current in the direction as indicated by the arrow 4, then deploying a vessel at position A2 will imply that the device will move against the current. If the current is too strong, or a minimum traverse-speed is to be maintained etc., it could become necessary to engage external propulsion and thus use stored power. It can therefore be beneficial to deploy a vessel 1 at position A1 instead such that the vessel can drift with the current 4. By taking into account the average glide speed and sea-current strength and direction an optimal area or position of deployment can be estimated such that there is a minimal engagement of propulsion in order to arrive at the intended final destination B1. This estimation can be done with a computer processor.

Figure 3:
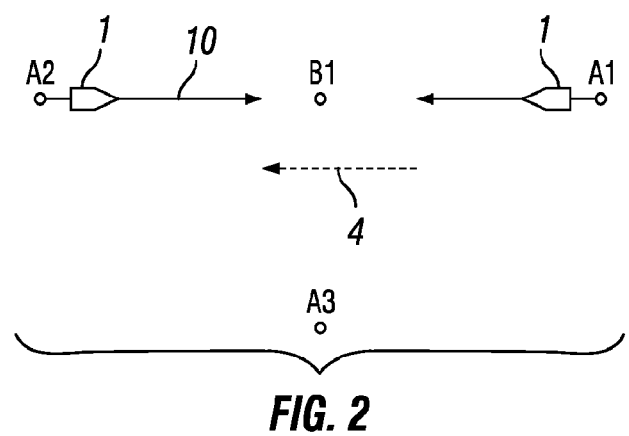
FIG. 3 is a schematic of various embodied features including cross current.

FIG. 3 shows effect of a cross sea current 4. In FIG. 3, as a vessel 1 travels from point A3 to point B1 along path 12, the sea current 4 works with the vessel 1. As a vessel 1 travels from point A1 to B1 along path 13, the vessel 1 accounts for the cross sea current 4 by turning left to partially go against the flow 4. If the vessel 1 is not turned, the vessel 1 will instead travel along path 14 due to drift.

According to the present application, there are a number of embodied features that can address this issue. One is to use a computer processor (which can be on the vessel) that takes into account the sea current 4 (known or measured) when initial location of the vessel is selected. As shown in FIG. 3, the vessel 1 could be placed at point A3, upstream of the intended destination B1, instead of at point A1. In that case, the vessel could drift with the sea current 3 and arrive at point B1, without needing to steer or alter direction.

Another is to use the computer processor to account for the water movement 4 and initial placement at A1. In that case, If the vessel 1 starts at A1 and travels to B1, the vessel 1 can take into account the water flow and steer itself partially to the left (toward A3) to counteract the water flow 4, thereby traveling along the path 13 with global reference. Similarly, the computer processor can select point A1' as a starting point, and the vessel 1 can aim itself perpendicular to the flow 4, thereby traveling in a global reference along path 15 toward B1 and path 16 with reference to the water.

Other factors that act in similar ways to sea current (water flow), as described above, can be wind, thermal movement of water (vertical or other directions), change in density or water, and/or eddies created by sea current. These factors can be input to the computer processor and vessel ahead of time, or can be detected in real time. It should be noted that in FIG. 3 the sea current is shown traveling linearly, but can travel along any non-linear curved path and be similarly accounted for. A vessel entering a curved eddy can use the computer processor to account for the curved flow of the eddy to determine where the vessel will be taken, and account for such accordingly.

The sea current (and other movements of water) can be determined in a number of ways. The sea current can be known from records, such as currents and tide charts. It can also be detected contemporaneously. Sonar devices can be used to detect current flow, and such can be located on an unmanned vehicle or a larger manned vessel. The vehicle can sense its movement and thereby deduce water movement acting upon the vessel.

The vessel can use the information relating to the currents in order to better guide and position itself with respect to its angle and direction of travel though the water so as to expect reduced amounts of energy and take less time during travel. Also, the vessel can use propulsion to compensate for forces acting upon the vessel by water currents.

In order to overcome the effect of drift induced by sea-currents, propulsion, for example one or more motorized propellers powered by batteries (non-rechargeable or rechargeable) via a control circuitry, may be used. The control circuitry (working with the computer processor) can decide whether to activate the propulsion system and in what manner. Motorized propellers will draw power and may drain the battery capacity when engaged. Therefore, it can be beneficial to reduce the need for engaging the propulsion system. Various embodiments described here can help reduce the need to engage the propulsion system.

Figure 4:
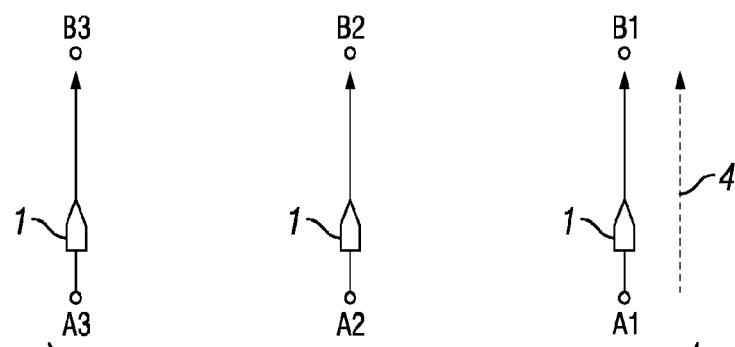
FIG. 4 is a schematic of various embodied features.

As shown in FIG. 4, vessels 1 may be deployed from positions A1, A2, or A3 (and so on). The choice of deployment position may also take into account other vessels (not shown) to be deployed simultaneously or sequentially with other devices. As shown in the drawing, a vessel may be deployed from position A2. A sea current 4 acts on the vessels.

Figure 5:
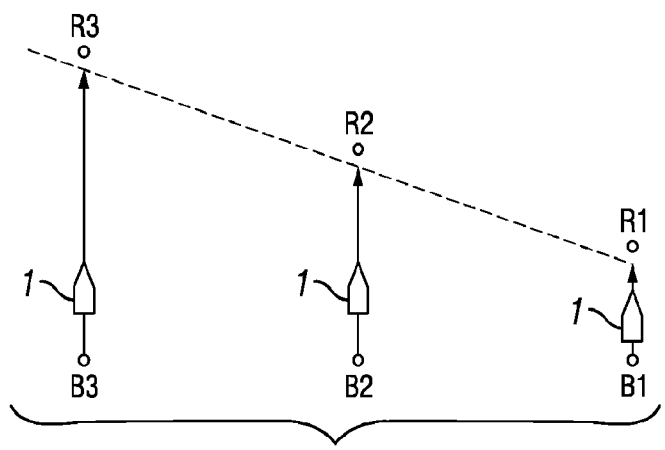
FIG. 5 is a schematic of various embodied features, including recovery features.

FIG. 5 shows these principals with respect to a collection of vessels. On recovery, the same principle applies. If the vessels are recovered along the same line as deployment, the devices may use external propulsion, not only to navigate against the current towards the original deployment position, but also may use propulsion to maintain the said positions until a vessel is available for recovery. According to various combinations of embodied features, it can be predicted that the devices will move in the direction as indicated by the sea-current 4 and thus may be recovered at positions R1, R2, R3 etc. Propulsion may be needed only at the very final stage where the devices are close to but not exactly in the vicinity of the recovery vessel and active propulsion is used to propel them to the final surface locations R1, R2, R3 etc., but the overall power used can be reduced.

Figure 6:
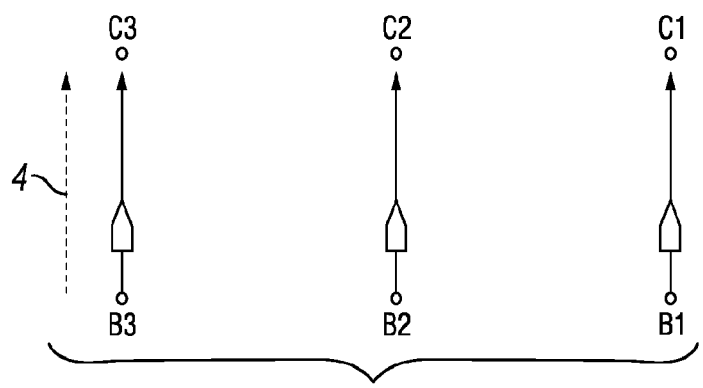
FIG. 6 is a schematic of various embodied features.

As shown in FIG. 6, for travel from positions B1, B2, B3 to positions C1, C2, C3 it may be clear that if the sea-currents are in the direction of the arrow 4, the optimal trajectories are from B1 to C1 and from B2 to C2 and from B3 to C3 as indicated in FIG. 6 along the paths shown. Additional propulsion may be needed to ensure that the devices will reach exactly the desired final positions C1, C2, C3 but is not needed to compensate for any drift.

Figure 7:
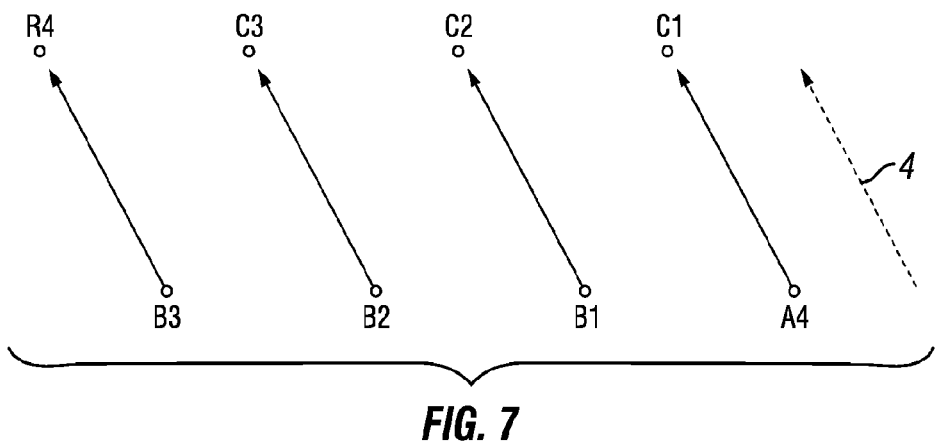
FIG. 7 is a schematic of various embodied features, including recovery features.

However, in the case of a change in current direction as indicated in FIG. 7, it may be advantageous to direct a vessel from B1 to C2 and similarly a vessel from B2 to C3. It will thus be helpful to deploy an extra vessel from position A4 towards final position C1 and a recovery vehicle at a position R4. This scenario can reduce the overall consumption of power due to the need of propulsion that would be required if the vessel was to relocate from B1 to C1 and so on. This is applicable when a large number of nodes are "hopping" in unison in a coordinated grid configuration where the direction the grid is intended to "hop" is at least partially faced with a cross flow of water.

Figure 8:
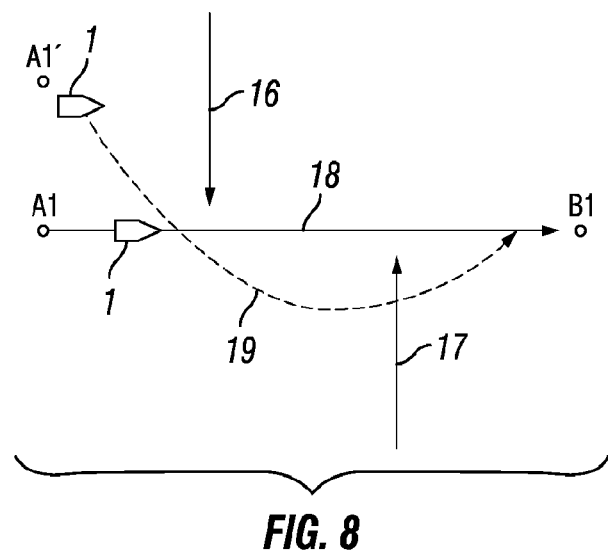
FIG. 8 is a schematic of various embodies features.

FIG. 8 shows a vessel traveling from point A1 to B1, where two separate cross movements of water are expected to be encountered. The first water movement is shown by the arrow 16 and generally moves in a first direction. Second water movement is shown by the arrow 17 and generally moves in a second direction that is different and counter to the first. FIG. 8 shows the directions being opposite to one another, but they can be in any orientation with respect to one another, including substantially right angles, collinear, or opposite. The vessel in FIG. 8 can take into account the two water movements 16 and 17 when determining an advantageous deployment location for the vessel so as to efficiently travel to B1. The vessel 1 can also address this by using the computer processor onboard to steer the vessel left and right (in the figure) to account for the flows 16 and 17, thus essentially maintaining the straight trajectory 18. An advantageous starting point such as A1' can be set in view of the flows 16 and 17, so that the computer processor on the vessel 1 can in view of the water movement (flow 16 and 17) keep the vessel aimed parallel to path 18, while taking the curved trajectory 19 on a global reference toward B1. A processor that did not take into account the future exposure to flows 16 and 17 may be deployed at A1' and merely aim the vessel 1 at B1 without taking into account the future encounter with the water flows, and thus not operate optimally.

The decision processes may be based on at least travel (trajectory) length, travel speed, water movement, direction and speed, and the amount of power available and required for subsequent relocations before recovery.

When large numbers of devices are deployed—such as swarms of 100's or 1000's devices—the trajectory information of some or all devices may be used to alter the course of any or all devices in real-time. For example, if the initial estimate of the current is along a direction, the devices may be designated to relocate from one location to another location. If however it is found that the devices are drifting sideways due to a sideways sea-current (which can be measured by accelerometers), then the sea-current information may be updated leading to a change in the (optimal) trajectory (and related steering of the vessel) and final position information for each device so as to make the overall power consumption of the device and/or group of devices at an acceptable level.

Sea-current information can be collected in advance of the deployment, recovery and/or relocation of vessels. The information may contain data on the direction and strength of sea-currents, on the surface and at depth. The data may also include a time dependent component, for example representing tidal information. The data may be obtained from historic measurements as well as real-time or near real-time measurement in the surveying area. Real time measurement data can be obtained via sonar based current measurement systems. Also the trajectory data from already deployed or recovered devices can add to the information on sea-currents at the surveying area.

Using the sea-current information and thereby expected drift of a deployed vessel, one may calculate the optimal deployment and recovery locations and/or times such that the vessel may reach its final position with a minimum use of non-renewable power for propulsion that otherwise would be needed to correct the actual trajectory for sea-current induced drifts. By using the available information on sea-currents, it will be possible to deploy and recover the vessels at locations such that reduced amount of power is used to actively propel the vessels with respect to the current.

In addition, when relocating vessels from a set of stationary positions B to a second set of stationary positions C—where B and C may be located at the sea surface or at the seabed—it can be advantageous to incorporate the information on the sea currents to decide which vessels from one position will relocate to another position. In order to ensure that all positions are occupied by a vessel, additional devices may be deployed. Those would typically be vessels for which the relocation to the remaining positions would consume too much power to be efficient.

Path planning methods may be used to derive the likely path and the uncertainty therein. Using said methods can be used recursively to determine the optimal positions as described in the present application. These calculations can be done by a computer processor on board the unmanned vessels.

There are a number of ways that the vessels can determine position during travel. One way is by GPS (Global Positioning Systems), which may best be used on the surface of water or when in communication with satellites. GPS uses signals from satellites to triangulate position. Similar principals can be used with land based signal sources (as opposed to satellites).

Acoustic sources from known locations can be used to determine position of the vessel. In that case, the acoustic signal can be sent at a known time, and based on the time travel the position of the vessel can be determined. Similarly, the vessel can produce an acoustic signal and based on the arrival of that signal at two or more receivers with known locations, the vessel position can be determined. Acoustic sources and/or receivers used to determine positon of a vessel can be located on or near the seabed, on vessels, on buoys, or on other vessels, so long as the position of the acoustic sources and/or receivers is known.

Pressure sensors can determine depth of the vessel, and can be used in connection with acoustic ranging devices to triangulate the position of the vessel.

An accelerometer and inclinometer or gyroscope can also be used to determine the travel and angular position of the vessel with respect to a known start position. A compass can be incorporated into and can be used to determine the heading of a vessel. By measuring acceleration and knowing how the vessel is positioned angularly, the position of the vessel can be estimated with respect to a start position. If a vessel starts at a position, and it is determined to accelerate along an x axis for a determined time, the resulting velocity and distance traveled can be derived. Similarly, the trajectory travel path can be determined to provide the vessel position with respect to the start position and end position. This can be done for two and three axes, so that the path of travel can be determined.

With a determined position during travel, known water movement and updated water movement information can be used by, as noted, the computer processor to steer and direct the vessel to advantageously travel to an end position.

A seismic sensor can be connected with the body of the vessel. The seismic sensor can be a hydrophone or a geophone or an accelerometer, and combinations therefor. They can be connected with a cable that connects with the vessel, or incorporated more closely with the vessel and into the vessel body.

For seabed applications, seismic sensors can be adapted to be coupled to the seabed when the vessel sits on the seabed. Coupling can be established by pressure applied by the body of the vessel pressing the sensor to the seabed. Coupling can be established by digging with water moved by the propulsion device, or other digging devices connected with the vehicle. Coupling can be established by way of the shape of the sensors or housings of the sensors having angled or pointed projections that penetrate into the top surface of the seabed. Coupling can be established by way of the shape of the vessel housing the seismic sensor. The vessel can have a pointed shape that when dropped onto the seabed tends to drive into or penetrate the stop surface of the seabed thereby aiding establishment of the coupling.

The preceding description is mean to aid the understanding of one skilled in the art, and is not meant in any way to unduly limit the scope of any present or future claims relating to this application.

What is claimed is:
1. An unmanned water vessel comprising:
a body having a shape adapted to travel through water;
at least one directional device that is exposed to the flow of water past the vessel when the vessel travels in a forward direction, the at least one directional device having a first position that provides an angle of attack through the water flow and a second position that provides a second angle of attack through the water flow;

a control system that processes positioning information for the vessel, and provides commands to the at least one directional device in view of a defined starting point, end point, and at least information about water movement that is determined in advance of travel from the start point to the end point and that is expected to be encountered by the water vessel during future travel between the starting point and the end point; and a seismic sensor connected with the body.

2. The unmanned water vessel of claim 1, comprising at least a two axis accelerometer, and at least one inclinometer.

3. The unmanned water vessel of claim 2, comprising a compass that determines a heading of the vessel.

4. The unmanned water vehicle of claim 1, comprising acoustic sensors that detect acoustic signals from at least two acoustic sources, and wherein the control system evaluates the time differential of arrival of the acoustic signals and calculates position of the vehicle.

5. The unmanned water vessel of claim 1, comprising an acoustic source that produces an acoustic signal to be detected by at least two acoustic receivers to thereby determine position of the vessel.

6. The unmanned water vessel of claim 1, comprising a power storage device that is connected with a motor that propels the vessel.

7. An unmanned water vessel comprising:
a body having a shape adapted to travel through water;
at least one propulsion device that has a first setting that does not provide steering force to the vessel, and a second setting that provides a steering force to the vessel; and
a control system that provides commands to the at least one propulsion device to select between the first and second setting in view of an end point, and at least information about water movement that is determined in advance of travel to the end point and that is expected to be encountered by the water vessel during travel.

8. The unmanned water vessel of claim 7, comprising at least a two axis accelerometer, and at least one inclinometer.

9. The unmanned water vessel of claim 7, comprising a compass.

10. The unmanned water vehicle of claim 7, comprising acoustic sensors that detect acoustic signals from at least two acoustic sources, and wherein the control system evaluates the time differential of arrival of the acoustic signals and calculates position of the vehicle.

11. The unmanned water vessel of claim 7, comprising an acoustic source that produces an acoustic signal to be detected by at least two acoustic receives to thereby determine position of the vessel.

12. A method of traveling an unmanned water vessel from a start position to an end position, comprising:
selecting a starting position based at least in part on water movement information for water that is expected to be encountered by the water vessel over the course of future travel and that is determined in advance of the future travel; and
steering the unmanned water vessel at least based on the water movement information.

13. The method of claim 12, comprising steering the unmanned water vessel to a location on the seabed.

14. The method of claim 12, comprising adjusting a propulsion device on the unmanned water vessel to steer.

15. The method of claim 12, comprising moving a directional device having a first position that provides an angle of attack through the water and a second position that provides a different angle of attack through the water, between the first and the second position thereby steering the vessel.

16. The method of claim 12, comprising determining the position of the unmanned water vessel over the course of future travel at various points.

17. The method of claim 14, wherein the determining of the position is done by way of measuring travel time of acoustic signals produced by at least two acoustic signal generators with known positions.

18. The method of claim 14, wherein the determination of the position is done by way of measuring travel time of an acoustic signal produced by the water vessel with at least two acoustic receivers having known positions.

19. The unmanned water vessel of claim 1, comprising a buoyancy control device.

* * * * *